Oct. 10, 1944.  S. A. STEVENS ET AL  2,360,288
LEAKAGE INDICATOR FOR ALTERNATING ELECTRIC CURRENT CIRCUITS
Filed Dec. 18, 1941
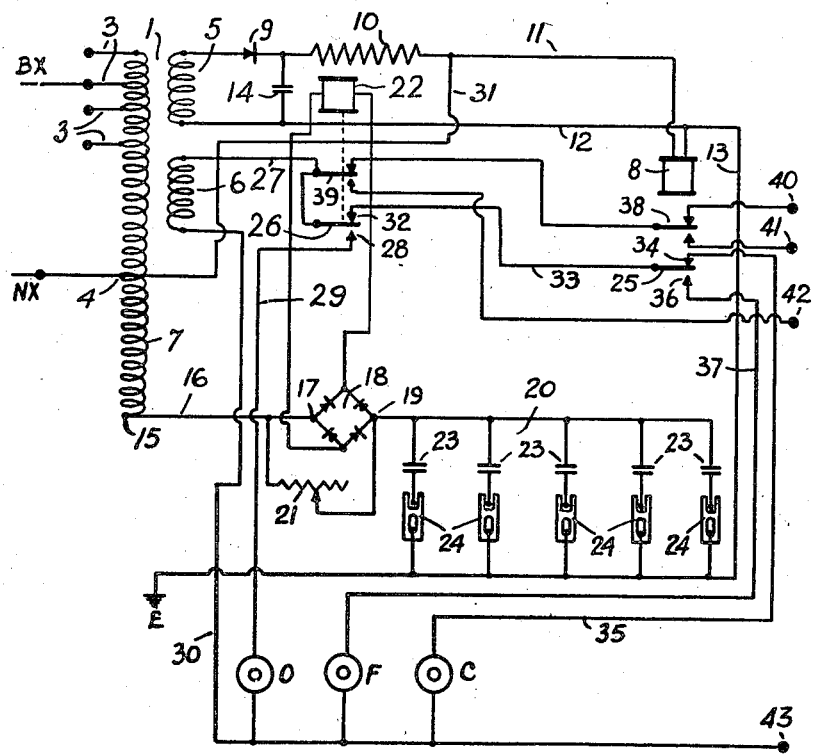
INVENTORS
Sydney Arthur Stevens and
Leslie Hurst Peter.
BY
THEIR ATTORNEY Patented Oct. 10, 1944

2,360,288

UNITED STATES PATENT OFFICE 2,360,288

LEAKAGE INDICATOR FOR ALTERNATING ELECTRIC CURRENT CIRCUITS

Sydney Arthur Stevens and Leslie Hurst Peter, King's Cross, London, England, assignors, by mesne assignments, to The Union Switch and Signal Company, Swissvale, Pa., a corporation of Pennsylvania Application December 18, 1941, Serial No. 423,560
In Great Britain June 24, 1940

2 Claims. (Cl. 177—311)

This invention relates to leakage indicators for alternating electric current circuits and has for its object to provide improved apparatus for this purpose whereby the leakage to earth of any conductor of the circuit is automatically indicated regardless of the total or individual capacity to earth of the conductors of the circuit.

It has previously been proposed to provide each circuit conductor with a transformer, one terminal of the primary winding of which is connected to the conductor and the other terminal to earth, the secondary winding of each transformer being arranged to supply current to a suitable leakage indicating device. This arrangement is quite satisfactory so long as the capacity to earth of each circuit conductor is substantially the same but difficulties in operation are experienced when as is often the case in modern power distribution systems the capacity to earth is very unequally distributed between the several conductors of the system.

According to the principal feature of the invention the difficulties above indicated are avoided by normally maintaining the circuit conductors at a suitable direct current potential above that of the earth by the application of a direct or rectified current voltage derived from any suitable source between the conductors and earth through a circuit including a control or indication device which is thus short-circuited in the event of a fault developing between any of the circuit conductors and earth.

The invention is illustrated by way of example in the accompanying drawing the single figure of which is a diagrammatic view of one form of apparatus embodying the invention.

Referring now to the drawing, it will be seen that the apparatus comprises a transformer 1 having a primary winding 2 provided adjacent to one terminal with a number of tappings 3 so as to render the apparatus suitable for a corresponding number of different circuit voltages. The circuit conductors of the circuit with which the apparatus is to be employed are indicated at BX and NX, the conductor NX being connected to the terminal 4 of the transformer primary winding 2 while the circuit conductor BX is connected to a suitable tapping 3.

The transformer 1 is provided with separate secondary windings 5 and 6 and an extension of the primary winding 2 constituting an autotransformer secondary winding 7.

The secondary winding 5 of the transformer 1 is connected to the energizing winding of a fault detector relay 8 through a circuit including a half-wave rectifier 9, a relatively high resistance 10 and conductors 11 and 12, the conductor 12 being connected through a conductor 13 to earth at E and a condenser 14 being connected across the circuit as shown in the drawing.

The terminal 15 of the secondary winding 7 of the transformer 1 is connected through a conductor 16 to an input terminal 17 of a full-wave rectifier 18, the other input terminal 19 of which is connected to the earthed conductor 13 through an adjustable condenser device 20, an adjustable resistance 21 being connected across the input terminals 17, 19. The output terminals of the rectifier 18 are connected to the energizing winding of a proving relay 22 which in conjunction with the detector relay 8 controls the operation of indicator lamps O, F, C or their equivalent as will be hereinafter explained.

The condenser device 20 comprises a set of five condensers 23 having capacities of, for example, 0.25 mf., 0.5 mf., 1 mf., 2 mf., and 2 mf. respectively, each condenser being provided with a cut-out switch 24, so that by closing one or more of the switches 24, any desired capacity can be connected between the terminal 19 of the rectifier 18 and the earthed conductor 13.

The adjustable resistance 21 is so constructed as to be capable of being set into a number of different resistance positions each corresponding to a capacity obtained by operating one or more of the switches 24 so that by corresponding adjustment of the resistance 21 and the switches 24 the voltage applied to the input 17, 19 of the rectifiers 18 has a suitable constant value, for example 10 volts.

The relay 8 is provided with a contact arm 25 and the relay 22 with a contact arm 26, each of these contact arms being arranged to cooperate with front and back relay contacts to control circuits hereinafter referred to.

The operation of the apparatus is as follows:

The circuit conductors NX and BX are connected respectively to the terminal 4 of the primary winding 2 of the transformer 1 and to a suitable tapping 3 such that the balancing voltage between the terminals 4 and 15 of the secondary winding 7 is a suitable value (for example 120 volts) regardless of the voltage across the circuit conductors NX and BX.

The voltage to earth of either the BX conductor or the NX conductor being approximately inversely proportional to the capacity of the conductor to earth it will be evident that by adjusting the switches 24 so as to vary the capacity between the terminal 15 of the secondary winding 7 and the earthed conductor 13, the point 4 and conductor NX can, due to the balancing voltage of the secondary winding 7, be caused to be at substantially earth potential, the BX conductor being at the line voltage above earth potential. In order to effect this a voltmeter is connected across the conductors NX and 13 and the switches 24 operated until the voltmeter reading is as low as possible indicating that the conductor NX is at substantially earth potential.

As already explained the operation of the switches 24 is accompanied by a corresponding adjustment of the resistance 21 so that for any setting of the switches 24 to effect the balancing action as above described the input voltage of the rectifier 18 is constant and the output voltage of this rectifier applied to the winding of the proving relay 22 will cause this relay to be energized so long as the capacity balance is normally operating. Otherwise the relay 22 becomes de-energized a circuit is completed from one terminal of the secondary winding 6 of the transformer 1 through conductor 27 contact arm 26 and back contact 28 of relay 22, conductor 29 indicator lamp O and conductor 30 to the other terminal of the secondary winding 6. The lamp O is then illuminated to indicate that the balancing portion of the apparatus is "out of order."

As regards the leakage indicator portion of the apparatus, the secondary winding 5 of the transformer 1, one terminal of which is connected to the earthed conductor 12, causes (through the action of the rectifier 9), a rectified voltage of for example, 6 to 8 volts to be applied across the conductors 11, 12, so that the conductor 11 and the conductor NX connected thereto through the conductor 31 is normally maintained at this positive potential above earth potential. Under these conditions energizing current is supplied to the winding of relay 8 and, assuming that the balancing portion of the apparatus is in order so that relay 22 is energized, a circuit is completed from one terminal of secondary winding 6 of transformer 1 through conductor 27, contact arm 26 and front contact 32 of relay 22, conductor 33, contact arm 25 and front contact 34 of relay 8, conductor 35, and indicator lamp C and conductor 30 to the other terminal of transformer secondary winding 6. The lamp C is thus illuminated to indicate that the circuit conductors are "clear" of faults.

In the event of a leak occurring between either of the circuit conductors BX or NX and earth, the winding of the relay 8 will evidently be thereby short-circuited so that this relay being released a circuit is completed from one terminal of secondary winding 6 through conductor 27, front contact 32 of relay 22, conductor 33, contact arm 25 and back contact 36 of relay 8, conductor 37, indicator lamp F and conductor 30 to the other terminal of transformer winding 6. The lamp F is thus illuminated to indicate a "fault" in the insulation of the circuit conductors BX or NX.

It should be observed that the detector relay 8 is so constructed as to release readily and promptly when its energization is reduced below normal.

In order to enable the indications above described, viz., "clear," "out of order" and "fault" to be given at a point remote from the apparatus, the relays 8 and 22 are each provided with an additional contact arms indicated at 38 and 39 respectively adapted to cooperate with front and back relay contacts similar to those above described for the contact arms 25 and 26 so as to control the supply of current from the transformer winding 6 to terminals 40, 41 and 42 to which conductors leading to the remote indicator lamps are connected the return conductor from these lamps being connected to the terminal 43.

It will be evident from the above description that the leakage detection and capacity balancing portions of the equipment operate quite independently of each other but the indications given are co-related, both portions of the apparatus being preferably enclosed in a single casing.

The apparatus of the invention may also comprise other devices such as meters and testing panels to enable the leakage resistance to earth which will just release the detector relay 8 to be determined and the readings of these devices may be arranged to be periodically recorded so as to enable the insulation of the circuit as a whole to be ascertained.

The detector relay 8 and the proving relay 22 may also if desired, be arranged to control audible indication devices as well as, or as an alternative to the indication lamps, and these relays may furthermore be arranged to control the operation of switch devices or their equivalent adapted to isolate a portion of the alternating current circuits in the event of a fault developing therein.

The invention is evidently not limited to the particular arrangements and connections above described and illustrated by way of example which may be varied in many respects without exceeding the scope of the invention.

Having now particularly described and ascertained the nature of our said invention and in what manner the same is to be performed, we declare that what we claim is:

1. A leakage indicator for alternating current circuits of the kind described comprising, in combination with the two conductors of the alternating current circuit, a transformer having its primary winding energized from said two conductors, a source of unidirectional potential derived from the secondary winding of said transformer, an indication relay connected across said source so as to remain constantly energized, a connection from one terminal of said relay to ground, and a direct connection from the other terminal of said relay to one but not the other of said two conductors, whereby if a ground develops on either of said conductors said relay will become short-circuited to provide an indication.

2. A leakage indicator for alternating current circuits of the kind described comprising, in combination with the two conductors of the alternating current circuit, each of said conductors having normally a given inherent value of capacity to ground associated therewith, means including an auto-transformer connection in which one of said conductors comprises one output terminal for deriving an output potential from said circuit, an adjustable capacity connected between the other output terminal and ground, said output potential and said adjustable capacity being so chosen as to substantially balance the effect of the inherent capacity of said one conductor to ground whereby said one conductor is maintained at substantially ground potential, and an indication device normally maintained energized from the circuit between said other output terminal and ground.

SYDNEY ARTHUR STEVENS.
LESLIE HURST PETER.